(12) United States Patent
Al-Yousif et al.

(10) Patent No.: US 11,867,038 B2
(45) Date of Patent: Jan. 9, 2024

(54) THICKENED $CO_2$ IN GRAVITY DRAINAGE GAS INJECTION PROCESSES

(71) Applicant: Saudi Arabian Oil Company, Dhahran (SA)

(72) Inventors: Zuhair Al-Yousif, Saihat (SA); Subhash Ayirala, Dhahran (SA); Muhammad Majid Almajid, Al Qatif (SA); Dong Kyu Cha, Dhahran (SA); Ming Han, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/643,067

(22) Filed: Dec. 7, 2021

(65) Prior Publication Data
US 2023/0175366 A1 Jun. 8, 2023

(51) Int. Cl.
*E21B 43/16* (2006.01)
*E21B 43/30* (2006.01)

(52) U.S. Cl.
CPC .................. *E21B 43/164* (2013.01)

(58) Field of Classification Search
CPC .... E21B 43/164; E21B 43/305; E21B 43/168; E21B 43/2408; E21B 43/2406; E21B 43/30; E21B 41/0057; E21B 41/0064; E21B 43/16
See application file for complete search history.

(56) References Cited

U.S. PATENT DOCUMENTS

| | | | | |
|---|---|---|---|---|
| 4,415,032 A | * | 11/1983 | Shu | E21B 43/164 166/266 |
| 4,800,957 A | | 1/1989 | Stevens et al. | |
| 4,852,651 A | * | 8/1989 | Davis | E21B 43/164 507/936 |
| 5,117,907 A | | 6/1992 | Hsu | |
| 10,030,483 B2 | | 7/2018 | Hancu et al. | |
| 10,851,632 B2 | | 12/2020 | Brown et al. | |
| 11,002,121 B2 | | 5/2021 | Rao et al. | |
| 2011/0186292 A1 | * | 8/2011 | Wheeler | E21B 43/24 166/272.3 |
| 2021/0025266 A1 | | 1/2021 | Ramirez et al. | |

FOREIGN PATENT DOCUMENTS

| | | | | |
|---|---|---|---|---|
| CA | 2902870 C | * | 4/2020 | ............ E21B 43/24 |
| CN | 104774604 | | 7/2015 | |
| WO | WO 2017204280 | | 11/2017 | |
| WO | WO 2022103645 | | 5/2022 | |

OTHER PUBLICATIONS

Translation of WO-2015135708-A1. (Year: 2015).*
(Continued)

*Primary Examiner* — Zakiya W Bates
(74) *Attorney, Agent, or Firm* — Fish & Richardson P.C.

(57) ABSTRACT

A method and a system for oil recovery are provided. An exemplary method includes injecting thickened carbon dioxide ($CO_2$) into the top of a reservoir containing oil. An interface is formed between the thickened $CO_2$ and the oil. The oil is mobilized by the thickened $CO_2$. The mobilized oil is recovered with a recovery well drilled below the reservoir.

24 Claims, 8 Drawing Sheets

(56) References Cited

OTHER PUBLICATIONS

Akhlaghi et al., "Gas Assisted Gravity Drainage by CO2 Injection" Energy Sources, Part A: Recovery, Utilization, and Environmental Effects. 34 (17), Feb. 2013, 1619-1627, 9 pages.

Al Hinai et al., "Experimental evaluations of polymeric solubility and thickeners for supercritical CO2 at high temperatures for enhanced oil recovery." Energy & fuels 32.2, Feb. 2018, 1600-1611, 37 pages.

AlYousef et al., "Direct Thickening of Supercritical Carbon Dioxide Using CO2-Soluble Polymer" SPE-197185-MS, Society of Petroleum Engineers, Nov. 2019, 11 pages.

Carpenter, "Development of Small-Molecule CO2 Thickeners" SPE-0714-0145-JPT, Society of Petroleum Engineers, Jul. 2014, 3 pages.

Enick et al., "A literature review of attempts to increase the viscosity of dense carbon dioxide." Website of the National Energy Technology Laboratory, Oct. 1998, 53 pages.

Enick et al., "Direct Thickeners For Carbon Dioxide" SPE-59325-MS, Society of Petroleum Engineers, Apr. 2000, 12 pages.

Gullapalli et al., "Gelling behavior of 12-hydroxystearic acid in organic fluids and dense CO2." SPE-28979, SPE International Symposium on Oilfield Chemistry, Feb. 1995, 13 pages.

Hatchell, "Gravity-Assisted Immiscible CO2 for Enhanced Oil Recovery and Storage." Jun. 2017, 66 pages.

Heller et al., "Direct Thickeners for Mobility Control of CO2 Floods" SPE-11789-PA, Society of Petroleum Engineers, Oct. 1985, 8 pages.

Huang et al., "Enhancement of the viscosity of carbon dioxide using styrene/fluoroacrylate copolymers." Macromolecules 33.15, Jul. 2000, 5437-5442, 7 pages.

Kasiri et al., "Gas-Assisted Gravity Drainage (GAGD) Process for Improved Oil Recovery" IPTC-13244, International Petroleum Technology Conference, Dec. 2009, 7 pages.

Lee et al., "Development of Small Molecule CO2 Thickeners for EOR and Fracturing" SPE-169039-MS, Society of Petroleum Engineers, Apr. 2014, 18 pages.

Rao et al., "Development of Gas Assisted Gravity Drainage (GAGD) Process for Improved Light Oil Recovery" SPE-89357, SPE/DOE Symposium on Improved Oil Recovery, Apr. 2004, 12 pages.

Rindfleisch et al., "Solubility of polymers and copolymers in supercritical CO2." The Journal of Physical Chemistry 100.38, Sep. 1996, 15581-15587, 7 pages.

Xu et al., "Thickening carbon dioxide with the fluoroacrylate-styrene copolymer." SPE Journal 8.02, Jun. 2003, 85-91, 7 pages.

Zhang et al., "Evaluation of polymers as direct thickeners for CO2 enhanced oil recovery." Journal of Chemical & Engineering Data 56.4, Apr. 2011, 1069-1079, 11 pages.

Bae et al., "A laboratory investigation of viscosofied CO2 process," SPE Advanced Technology Series, Apr. 1993, 1(1):166-171, 6 pages.

PCT International Search Report and Written Opinion in International Appln. No. PCT/US2022/051857, dated Mar. 30, 2023, 17 pages.

* cited by examiner

THICKENED CO₂ IN GRAVITY DRAINAGE GAS INJECTION PROCESSES

TECHNICAL FIELD

The present disclosure relates to $CO_2$ gravity drainage gas injection processes for efficient oil recovery.

BACKGROUND

An oil reservoir is a subterranean formation where oil is entrapped. The oil can be recovered using one or more recovery wells formed in the reservoir. If the oil is entrapped at a pressure greater than ambient pressure, the oil is often recovered using the reservoir pressure alone. Where the oil is entrapped at pressures below ambient pressure, secondary or tertiary (enhanced oil recovery (EOR)) techniques have been implemented to recover the oil. For example, one secondary technique involves injecting water into the reservoir to increase its pressure, which mobilizes some of the remaining oil.

One EOR technique is known as "gravity drainage gas injection." This technique involves injecting a gas into the reservoir, which improves oil recovery beyond what is achieved with a secondary recovery technique. $CO_2$ gas has been used in gravity drainage gas injection processes. In particular, the $CO_2$ is injected into the reservoir to mobilize the oil. The mobilized oil is pushed towards recovery wells such that "free gravity drainage" is supplemented with "forced gravity drainage" due to the injected $CO_2$.

SUMMARY

Certain aspects of the invention are implemented as a method for oil recovery. The method includes injecting thickened $CO_2$ into the top of a reservoir containing oil; forming an interface between the thickened $CO_2$ and the oil; mobilizing the oil; and recovering the oil with a recovery well drilled below the reservoir.

Certain aspects of the invention are implemented as a system for oil recovery. The system includes an injection well; a reservoir containing oil positioned below the injection well; thickened $CO_2$; an interface between the thickened $CO_2$ and the oil; and a recovery well drilled below the reservoir.

The details of one or more implementations of the subject matter of this specification are set forth in the accompanying drawings and the description. Other features, aspects, and advantages of the subject matter will become apparent from the description, the drawings, and the claims.

DETAILED DESCRIPTION

Figure 1:
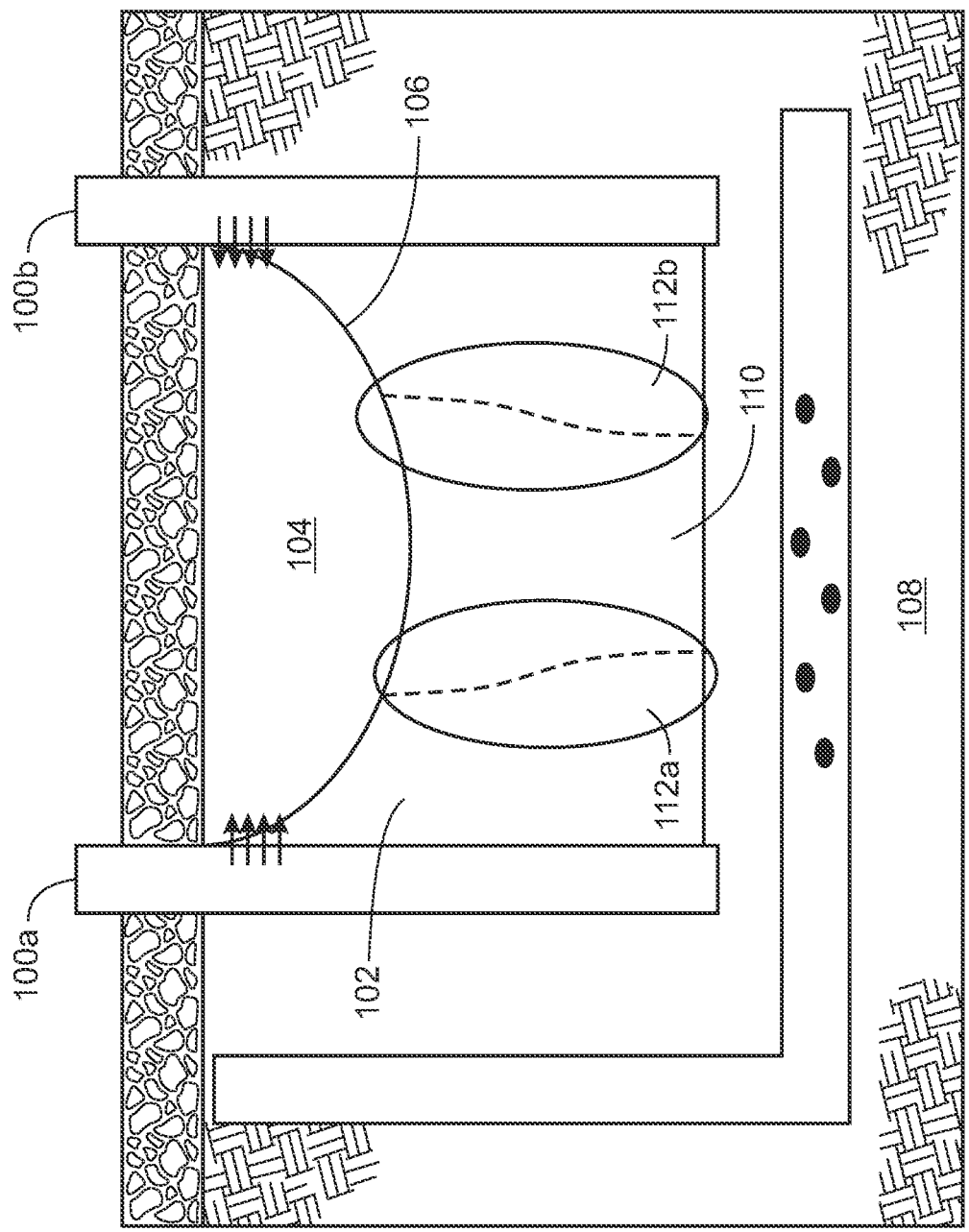
FIG. 1 is a schematic diagram of an example system for using thickened $CO_2$ in a gravity drainage gas injection process.

Gravity drainage gas injection processes involve injecting a gas, such as $CO_2$, into a reservoir to mobilize oil in the reservoir, allowing the oil to be recovered. Gravity drainage gas injection is typically used as an EOR process. Most gravity drainage gas injection processes have a slow response, meaning that it takes a relatively longer time after injecting the displacing fluids to see the impact on the oil recovery, and low oil recovery rates. The slow response and the low oil recovery rates increase the amount of injection gas required to recover oil. These limitations have rendered gravity drainage gas injection processes, including processes using $CO_2$, unattractive for field practice and not economically feasible.

Gravity drainage gas injection processes are limited because of low gas injection rates used. Low gas injection rates have been required to meet the so-called "critical gas injection rate" criterion. The critical gas injection rate is the highest-allowable gas injection rate in a gravity drainage gas injection process that can maintain a balanced gas front by relying on gravitational stability while lowering the viscous force with the reduced rate of injection.

The critical gas injection rate is one of the most important operational parameters for gravity drainage gas injection processes because it defines the stability of the growing gas-oil interface that steadily moves towards the recovery well. The critical gas injection rate defines the upper limit that the injection rate in a gravity drainage gas injection process should not exceed. If the gas injection rate exceeds the critical gas injection rate, the gas front destabilizes, resulting in premature gas breakthrough and gas short-circuiting in the recovery well. To avoid this issue, oil production is maintained at slow rates in the recovery wells such that the oil production rate is balanced by the equivalent $CO_2$ injection volume. The interface between the advancing injection gas and the recovered oil must be precisely controlled to stabilize gravitational forces and result in stable movement of gas-oil interface downward with the controlled production withdrawal rate.

Critical gas injection rates are typically low, rendering gravity drainage gas injection process impractical. Gas thickeners may be used to increase critical gas injection rates. But despite many years of research, the industry has not found a thickener that is inexpensive, environmentally-friendly, and effective—such as a thickener that can dissolve in dense $CO_2$ at diluted concentrations and decrease the mobility of the $CO_2$ to a level comparable to that of oil. A major obstacle hindering these efforts has been the limited solubility of proposed thickeners in $CO_2$, which restricts their ability to increase the $CO_2$ viscosity and the critical gas injection rate. Prior proposed solutions also involve costly materials and materials with environmental concerns (such as those associated with fluorinated thickeners), which have prevented their use in the oilfield.

The subject matter described in this specification can be implemented in particular implementations, to realize one or more of the following advantages. The subject matter seeks to resolve the above issues by implementing thickened $CO_2$ to replace prior recovery methods. In some embodiments, the techniques are used to enhance production from oil sands or other unconsolidated reservoirs. The thickened $CO_2$ increases the response and recovery rate of gas-drainage processes by increasing the critical gas injection rate. The increased critical gas injection rate allows for the use of higher gas injection rates. This results in increased response due to the combined effects of forced gravity drainage with free gravity drainage. Further, this allows higher oil production recovery rates, thereby increasing ultimate oil recovery in recovery wells. The higher oil recovery rates reduce the $CO_2$ gas utilization per barrel of oil recovered.

In addition, $CO_2$ is known to be a major contributor to the greenhouse effect and global warming. In some embodiments, environmental effects of using $CO_2$ are mitigated because it can be injected into subsurface rocks helping to reduce the amount of $CO_2$ in the atmosphere. Further, similar to waterless fracking operations, using thickened $CO_2$ instead of water-based chemicals, such as foams, helps minimize water consumption.

FIG. 1 is a schematic diagram of an example system for using thickened $CO_2$ in a gravity drainage gas injection process. FIG. 1 includes injection wells 100, a reservoir containing oil 102 positioned below the injection wells 100, thickened $CO_2$ 104, an interface 106 between the thickened $CO_2$ and the oil, and a recovery well 108 drilled below the reservoir.

FIG. 1 further shows the interface 106 positioned at the top of a pay zone. The pay zone includes high-permeable channels 112. The injection wells 100 inject the thickened $CO_2$ 104 to create the interface 106.

Figure 2:
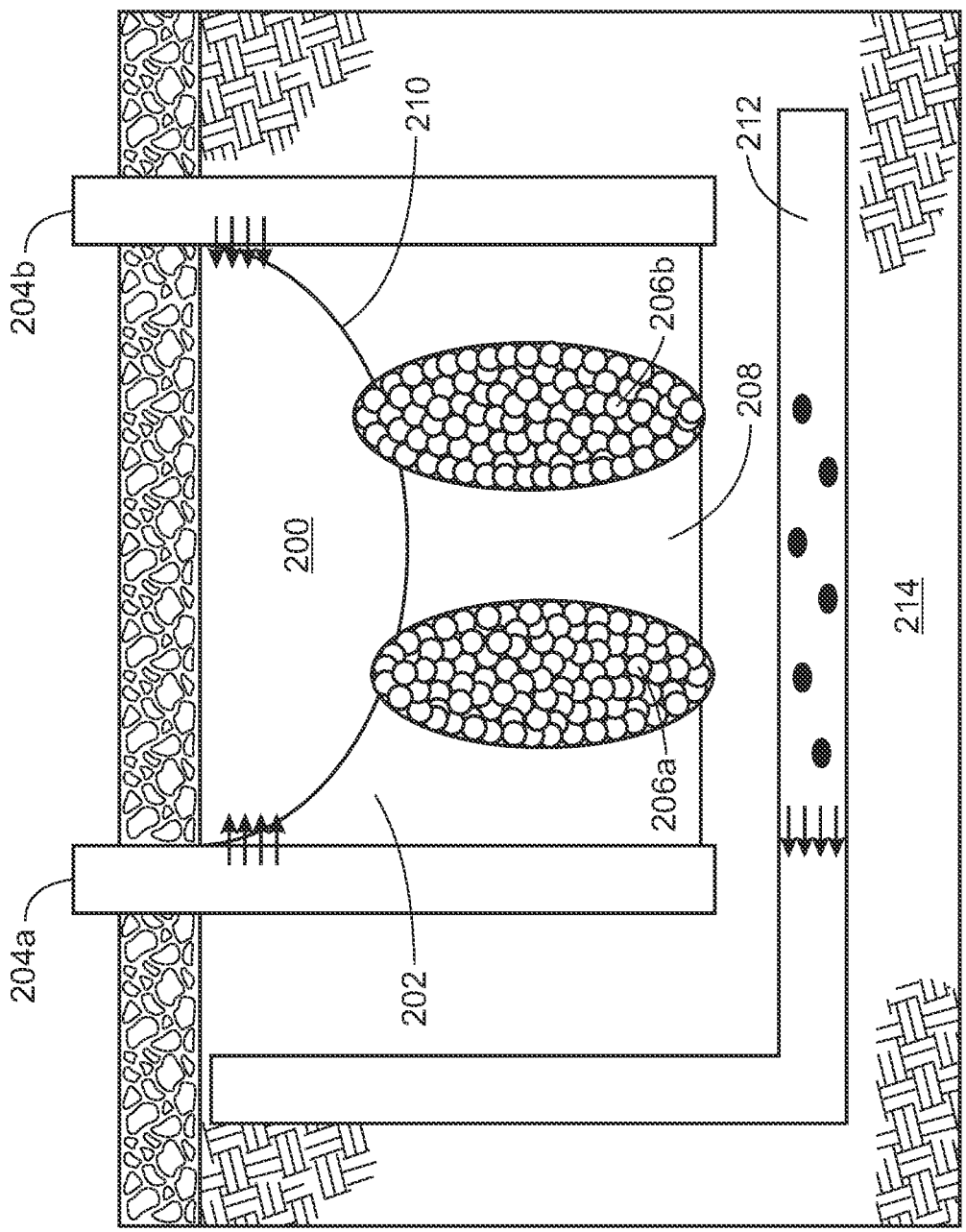
FIG. 2 is a schematic diagram of an example system where thickened $CO_2$ blocks high-permeable channels.

FIG. 2 is a schematic diagram of an example system. Thickened $CO_2$ 200 is injected into a reservoir 202 by injection wells 204. The thickened $CO_2$ 200 blocks high-permeable channels 206 in a pay zone 208. This reduces the relative permeability of the gas and increases the critical gas injection rate. Therefore, the thickened $CO_2$ 200 can be injected at higher gas injection rates to form the interface 210 quickly at the top of the pay zone 208. After thickened $CO_2$ 200 is injected, the oil 212 is mobilized with unthickened $CO_2$ and driven towards a recovery well 214 to be drained.

In some implementations, the thickener for the $CO_2$ is a mixture of different compounds including copolymer of allenethers, acrylate, acrylic long carbon chain esters/benzenes, propylene carbonate/allyl ethyl carbonate, dimethyl carbonate, and white oil/silicon or oil/petroleum ether.

Figure 3:
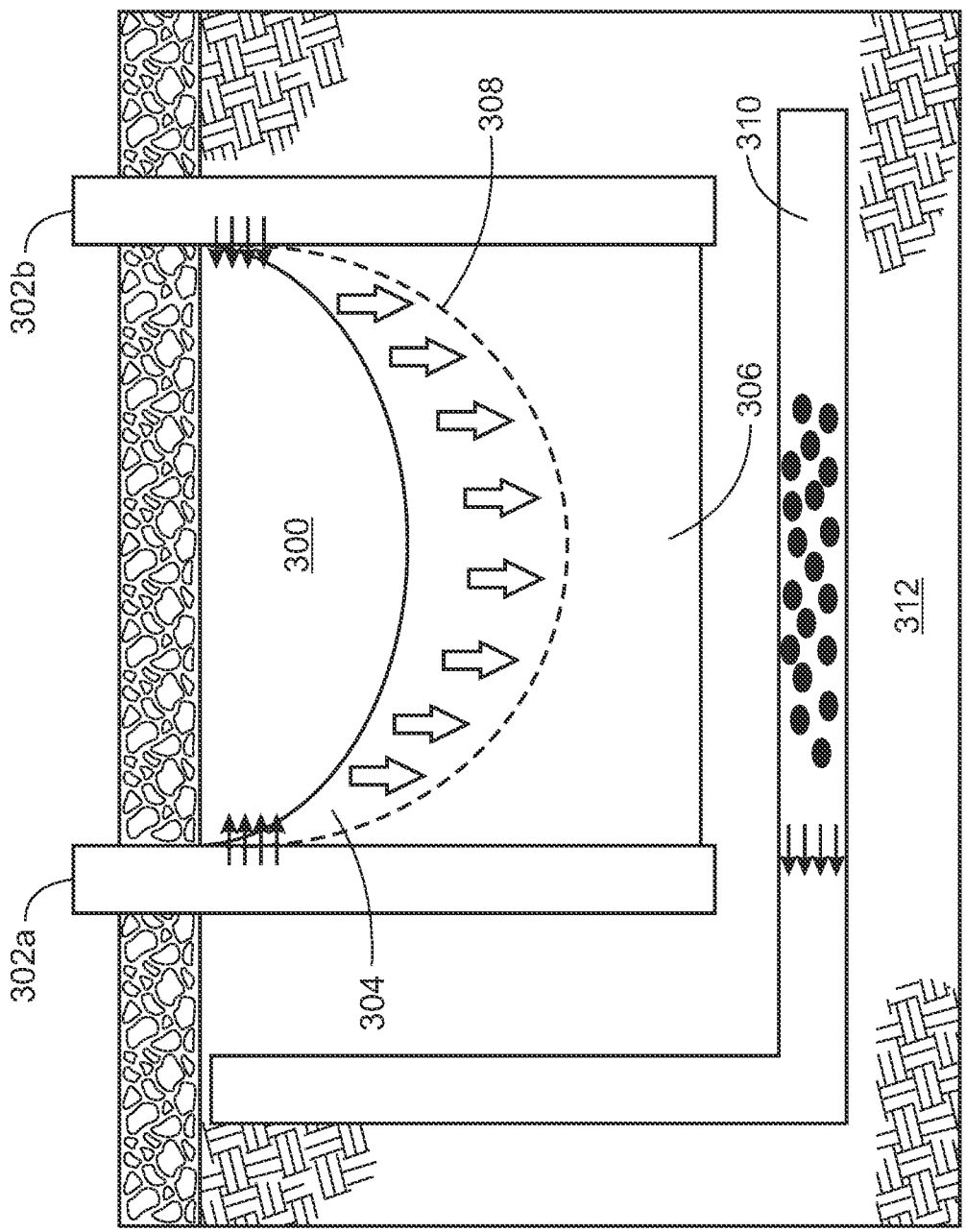
FIG. 3 is a schematic diagram of an example system where thickened $CO_2$ causes uniform sweep across a pay zone.

FIG. 3 is a schematic diagram of an example system. As thickened $CO_2$ 300 is injected by injection wells 302, it creates an expanded gas chamber 304 in the reservoir 306. The blockage of high-permeable channels 208, as shown in FIG. 2, equalizes the resistances in different pathways and creates a more uniform sweep at the interface 308, increasing sweep efficiency. The interface 308 will expand with time and the forced gravity drainage will supplement the free gravity drainage and increase the oil drainage rate. After thickened $CO_2$ 300 is injected, the oil 310 is mobilized with unthickened $CO_2$ and driven towards a recovery well 312 to be drained.

In an embodiment, the thickened $CO_2$ is injected at an amount of 0.1 to 0.2 pore volumes. Pore volume is the volume within a certain number of injectors and producers and is used herein to mean the pore volume of the target zone and not of the entire reservoir. Further, thickened $CO_2$ is injected by a vertical injection well. In some embodiments, thickened $CO_2$ is injected by any other type of injection wells, such as a horizontal injection well. Additionally, oil is recovered with a horizontal recovery well. Oil is alternatively recovered by any other type of recovery well, such as a vertical recovery well.

Figure 4:
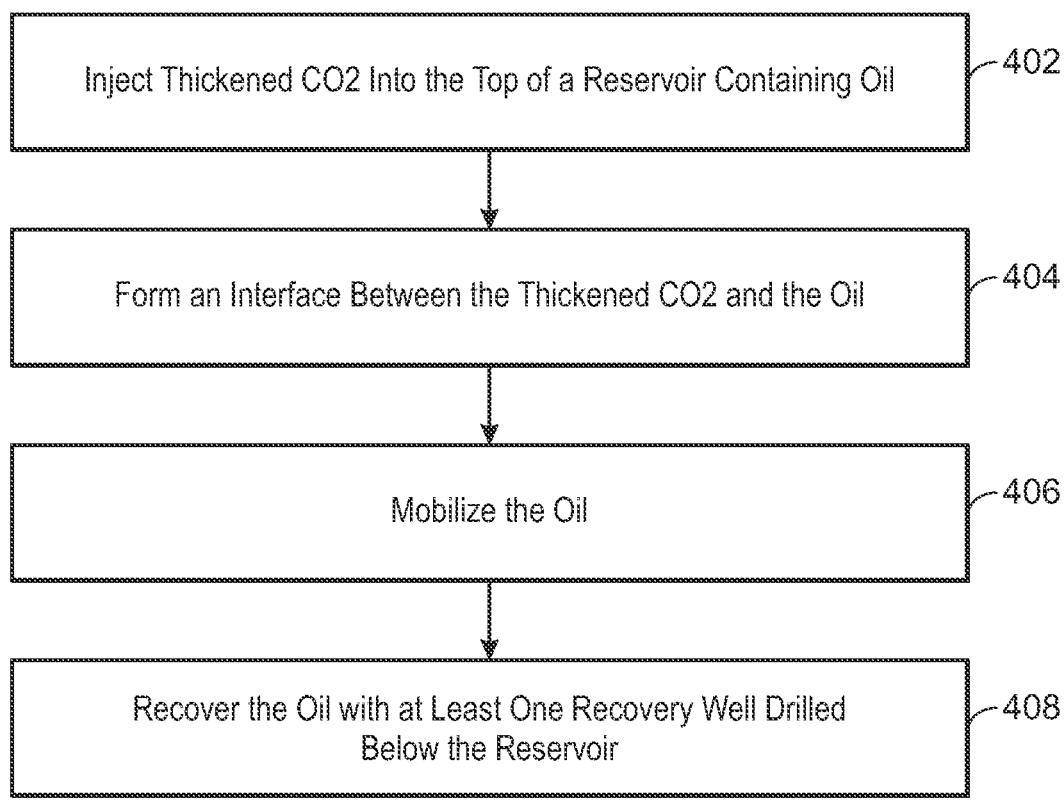
FIG. 4 is a flow chart of an example method for using thickened $CO_2$ in a gravity drainage gas injection process.

FIG. 4 is a flow chart of an example method for using thickened $CO_2$ in a gravity drainage gas injection process. At block 402, thickened $CO_2$ is injected into the top of a reservoir containing oil. At block 404, an interface is formed between the thickened $CO_2$ and the oil. At block 406, the oil is then mobilized. At block 408, the oil is recovered with a recovery well drilled below the reservoir 408.

EXAMPLES

Example 1

Preparing Thickened $CO_2$

TABLE 1

| Thickener Property | Value |
| --- | --- |
| Molecular Weight | 500,000 g/mol |
| pH | 5.0-8.0 |
| Appearance | White emulsion |
| Relative Density | 0.90-1.10 |
| Solubility | Soluble in liquid and supercritical $CO_2$ |
| Dissolution speed of 1% of the chemical in liquid CO2 at 25° C. | ≤3 minutes |

Table 1 shows properties of the thickener used in the present tests of the techniques. $CO_2$ gas with 99.50% purity was used to determine the thickener properties shown in Table 1. The thickener described is available commercially as a dry-fracturing fluid friction reducer and thickener under the name APFR-2 by manufacturer Beijing AP Polymer Technology CO., LTD. The thickener is 50 vol. % of allenether, acrylate, acrylic long carbon chain ester, acrylic long, and carbon chain benzene and 50 vol. % propylene carbonate ethyl carbonate, propylene allyl ethyl carbonate, dimethyl carbonate, white oil, silicon, and petroleum ether. Table 1 shows that the thickener has a molecular weight of 500,000 g/mol, a pH of 5.0 to 8.0, a relative density of 0.90 to 1.10, and a dissolution speed of less than about three minutes for one percent in liquid $CO_2$ at 25° C. The thickener is able to dissolve in $CO_2$ at conditions similar to those of oil fields.

Figure 5:
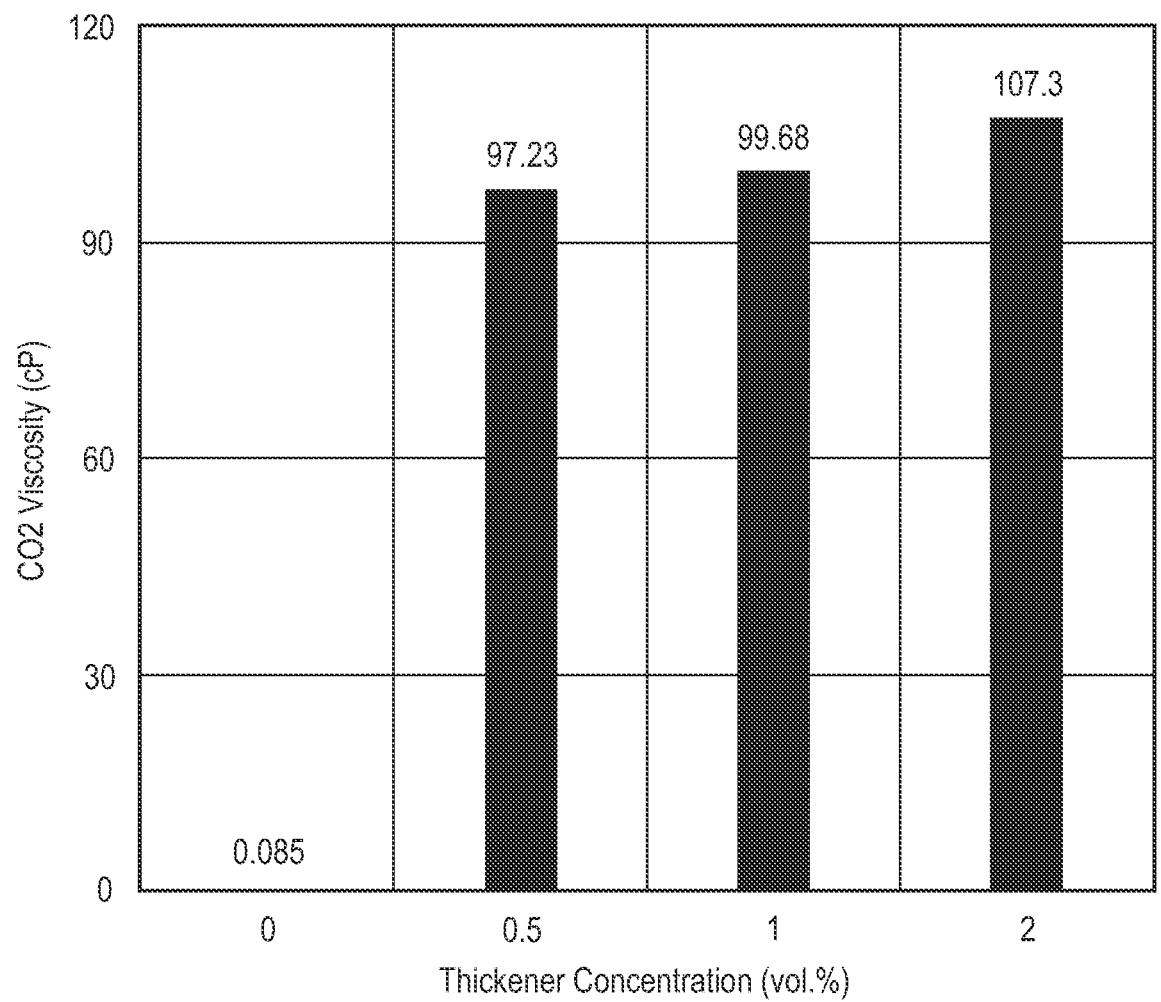
FIG. 5 shows $CO_2$ viscosities at 2000 psi after being mixed with different amounts of an example thickener.
Figure 6:
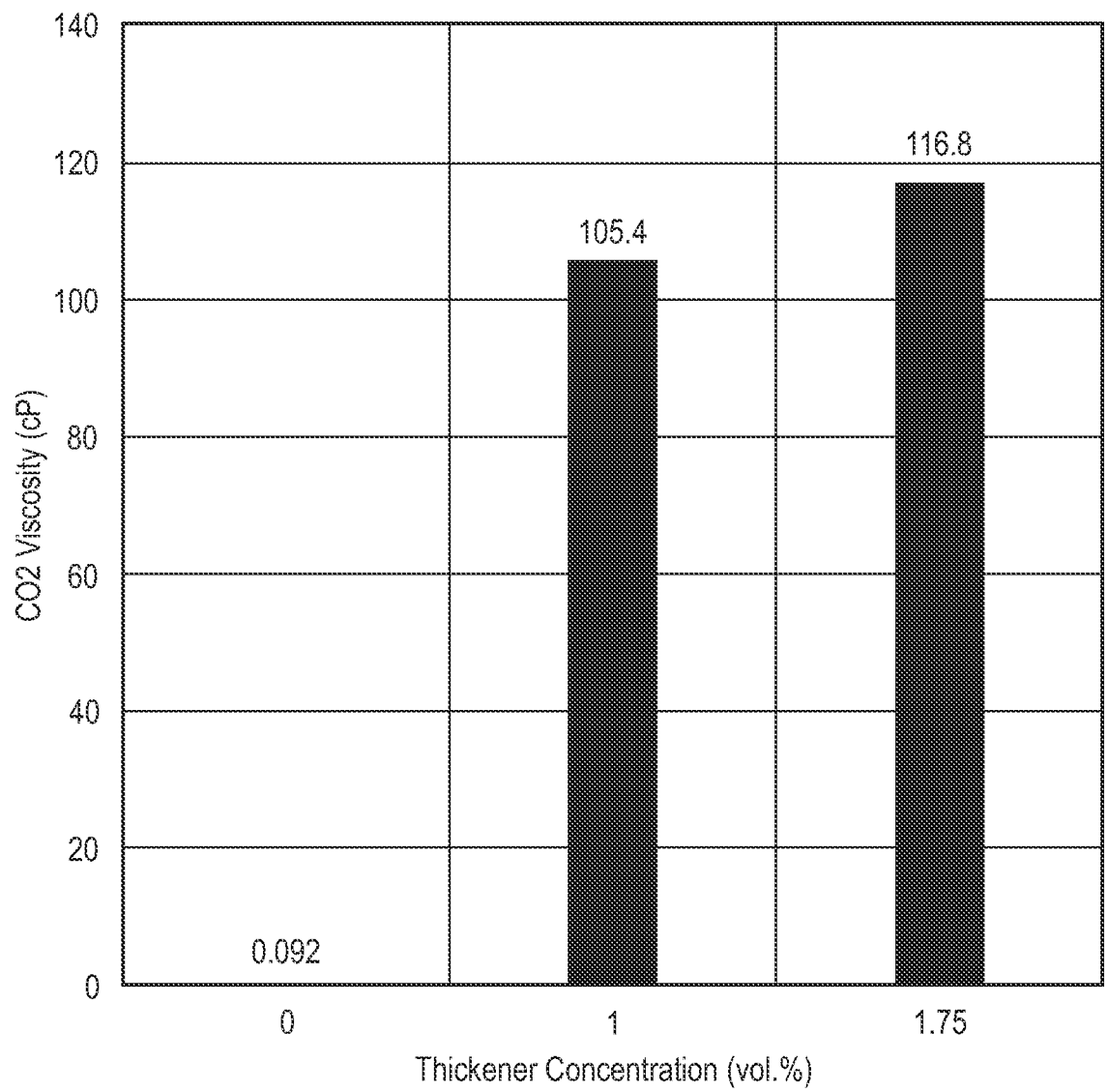
FIG. 6 shows $CO_2$ viscosities at 2500 psi after being mixed with different amounts of an example thickener.
Figure 7:
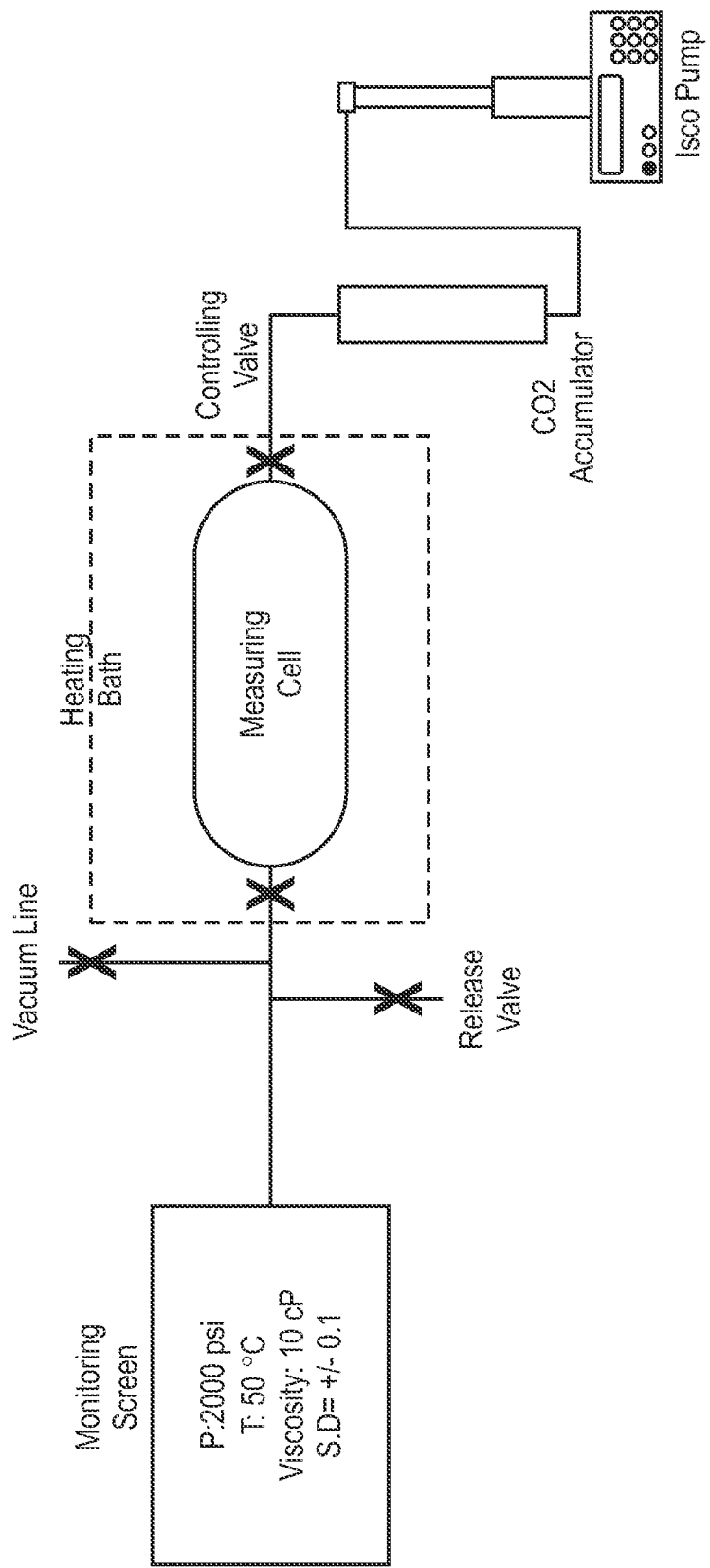
FIG. 7 is a schematic diagram of the device used to measure the data shown in FIGS. 5 and 6.

FIG. 5 is a graph of $CO_2$ viscosities at 2000 psi after being mixed with different amounts of the thickener. FIG. 6 is a graph of $CO_2$ viscosities at 2500 psi after being mixed with different amounts of the thickener. A Cambridge HTHP viscometer apparatus, as shown in the schematic of FIG. 7, was used to conduct the viscosity measurements using different concentrations of the thickener and at different pressures. The objective of the tests shown in FIGS. 5 and 6 was to measure liquid and supercritical $CO_2$ viscosity at different conditions when the thickener is added to the dense $CO_2$. FIGS. 5 and 6 show that the addition of the thickener to the $CO_2$ enhances the $CO_2$ viscosity significantly. As seen, $CO_2$ viscosity increases between about 1100 and 1250 times as a result of adding the thickener.

Example 2

Injecting Thickened $CO_2$ Into a Rock Sample

TABLE 2

| Rock | Length Inches | Diameter Inches | Porosity % | Permeability Before Thickened $CO_2$ Injected mD | Permeability After a Pore Volume of 2 Thickened $CO_2$ Injected mD | Injection rate ml/min | Pressure Psi |
|---|---|---|---|---|---|---|---|
| Indiana Limestone | 4 | 1.5 | 18 | 58.9 | 1.3 | 5 | 2000 |

Table 2 shows Indiana limestone properties and experimental conditions. Thickened $CO_2$ in the amount of a pore volume of 2 was injected into the Indiana limestone sample. The thickened $CO_2$ was a mixture of 2 vol. % of the thickener and 98 vol. % supercritical $CO_2$. The thickened $CO_2$ reduced the permeability of the rock from 58.9 mD (at 0 pore volumes thickened $CO_2$) to 1.3 mD (at 2 pore volumes thickened $CO_2$). This is about a 45 times reduction.

Figure 8:
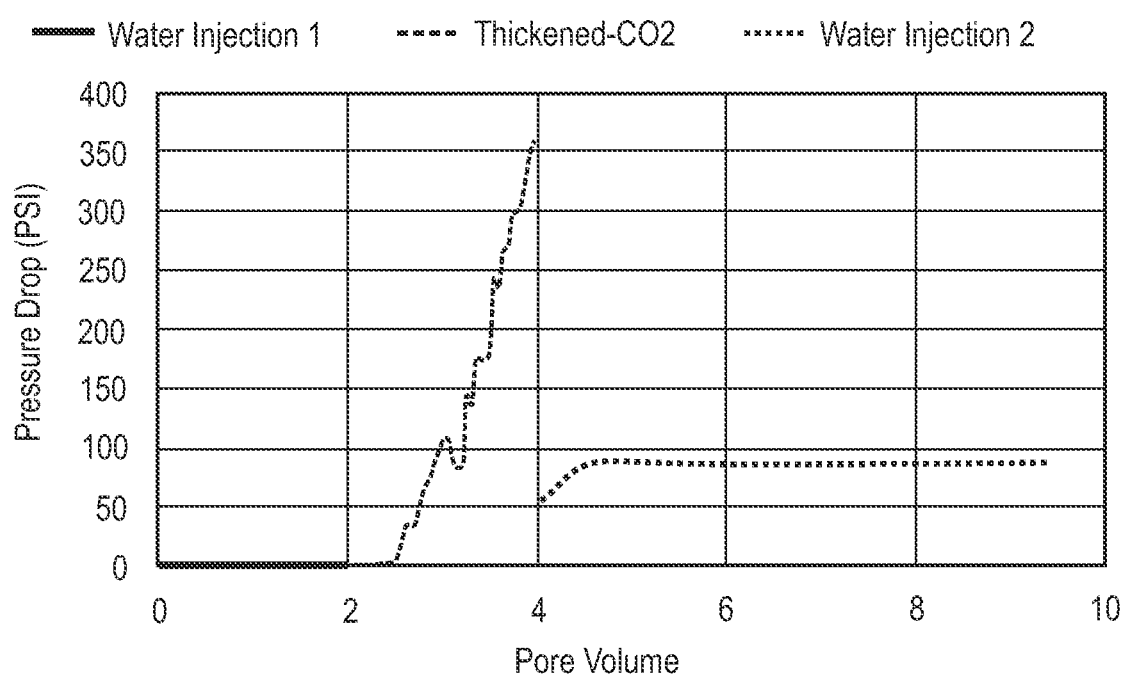
FIG. 8 shows the results of an experiment showing the pressure drop across a rock sample during water injection for pre-thickened-$CO_2$ and post-thickened-$C_2$ treatments.

FIG. 8 shows the results of an experiment showing the pressure drop across the Indiana limestone sample of Table 2 during water injection for pre-thickened-$CO_2$ and post-thickened-$CO_2$ treatments. First, the Indiana limestone was injected with water in the amount of two pore volumes. The water injection was a baseline test used for a comparison purpose to model the initial state of the reservoir. The water injected was seawater similar to that used in the fields. As seen, the pressure drop across the Indiana limestone sample was negligible.

Next, thickened $CO_2$ in the amount of two pore volumes was injected into the Indiana limestone. This caused a pressure drop of over 350 psi.

The Indiana limestone was then injected with a second sample of water in the amount of over five pore volumes. This caused an additional pressure drop of close to 100 psi. The increase in the pressure drop during the second water injection reflects the resistance caused by the presence of thickened $CO_2$ in the porous media. After treating the formation with thickened $CO_2$, which blocks the high-permeable channels, the second injected water follows paths in the low-permeable channels.

FIG. 8 shows the efficiency of the thickened $CO_2$ to block the high-permeable channels and therefore reduce the mobility of the injected fluids. The results showed that even after injecting a few pore volumes (less than 0.5 pore volume), the pressure drop increased, which indicates the efficiency of the thickened $CO_2$.

Described implementations of the subject matter can include one or more features, alone or in combination. For example, an implementation is a method that includes the following steps. Injecting thickened $CO_2$ into the top of a reservoir containing oil; forming an interface between the thickened $CO_2$ and the oil; mobilizing the oil; and recovering the oil with a recovery well drilled below the reservoir.

The foregoing and other described implementations can each, optionally, include one or more of the following features:

The thickened $CO_2$ includes $CO_2$ and thickener including a copolymer of allenether, acrylate, acrylic long carbon chain ester, acrylic long carbon chain benzene, propylene carbonate ethyl carbonate, propylene allyl ethyl carbonate, dimethyl carbonate, white oil, silicon, petroleum ether, or a combination thereof.

The thickener has a molecular weight of 500,000 g/mol, a pH of 5.0 to 8.0, a relative density of 0.90 to 1.10, a dissolution speed of less than about three minutes for one percent in liquid $CO_2$ at 25° C., or a combination thereof.

About 0.1 to 0.2 pore volumes of thickened $CO_2$ is injected into the reservoir.

The thickened $CO_2$ comprises 2 vol. % thickener and 98 vol. % supercritical $CO_2$.

The interface is positioned at the top of a pay zone comprising high-permeable channels.

The thickened $CO_2$ blocks the high-permeable channels.

The thickened $CO_2$ is injected so that it is uniform across the interface.

The thickened $CO_2$ is injected at or below the critical gas injection rate.

The thickened $CO_2$ is continuously injected.

The thickened $CO_2$ is injected using a vertical injection well.

The thickened $CO_2$ is injected using a horizontal injection well.

The recovery well is a horizontal recovery well.

The recovery well is a vertical recovery well.

The reservoir pressure is below ambient pressure.

The oil is recovered using forced gravity drainage and free gravity drainage.

The oil is mobilized with unthickened $CO_2$ injected into the top of the reservoir.

A second implementation is a system that includes an injection well; a reservoir containing oil positioned below the injection well; thickened $CO_2$; an interface between the thickened $CO_2$ and the oil; and a recovery well drilled below the reservoir.

The foregoing and other described implementations can each, optionally, include one or more of the following features:

The thickened $CO_2$ comprises $CO_2$ and thickener comprising a copolymer of allenether, acrylate, acrylic long carbon chain ester, acrylic long carbon chain benzene, propylene carbonate ethyl carbonate, propylene allyl ethyl carbonate, dimethyl carbonate, white oil, silicon, petroleum ether, or a combination thereof.

The thickener has a molecular weight of 500,000 g/mol, a pH of 5.0 to 8.0, a relative density of 0.90 to 1.10, a dissolution speed of less than about three minutes for one percent in liquid $CO_2$ at 25° C., or a combination thereof.

The reservoir comprises about 0.1 to 0.2 pore volumes of thickened $CO_2$.

The thickened $CO_2$ comprises 2 vol. % thickener and 98 vol. % supercritical $CO_2$.

The system has a pay zone positioned below the interface, and the pay zone has high-permeable channels.

The thickened $CO_2$ blocks the high-permeable channels.
The thickened $CO_2$ is uniform across the interface.
The injection well is a vertical injection well.
The injection well is a horizontal injection well.
The recovery well is a horizontal recovery well.
The recovery well is a vertical recovery well.
The reservoir pressure is below ambient pressure.

Thus, particular implementations of the subject matter have been described. Other implementations are within the scope of the following claims.

What is claimed is:

1. A method for oil recovery, comprising:
   injecting thickened $CO_2$ into the top of a reservoir containing oil, wherein the thickened $CO_2$ comprises a thickener comprising a mixture of a copolymer with propylene carbonate, allyl ethyl carbonate, dimethyl carbonate, white oil, silicon, oil, or petroleum ether, or combinations thereof;
   forming an interface between the thickened $CO_2$ and the oil;
   mobilizing the oil with unthickened $CO_2$, wherein the unthickened $CO_2$ is injected after the thickened $CO_2$; and
   recovering the oil with a recovery well drilled below the reservoir.

2. The method of claim 1, wherein the thickener has a molecular weight of 500,000 g/mol, a pH of 5.0 to 8.0, a relative density of 0.90 to 1.10, a dissolution speed of less than about three minutes for one percent in liquid $CO_2$ at 25° C., or a combination thereof.

3. The method of claim 1, wherein about 0.1 to 0.2 pore volumes of thickened $CO_2$ is injected into the reservoir.

4. The method of claim 1, wherein the thickened $CO_2$ comprises 2 vol. % thickener and 98 vol. % supercritical $CO_2$.

5. The method of claim 1, wherein the thickened $CO_2$ reduces the relative permeability of the gas in the reservoir.

6. The method of claim 1, wherein the thickened $CO_2$ is injected so that it is uniform across the interface.

7. The method of claim 1, wherein the thickened $CO_2$ is injected at or below the critical gas injection rate.

8. The method of claim 1, wherein the thickened $CO_2$ is continuously injected.

9. The method of claim 1, wherein the thickened $CO_2$ is injected using a vertical injection well.

10. The method of claim 1, wherein the thickened $CO_2$ is injected using a horizontal injection well.

11. The method of claim 1, wherein the recovery well is a horizontal recovery well.

12. The method of claim 1, wherein the recovery well is a vertical recovery well.

13. The method of claim 1, wherein the reservoir pressure is below ambient pressure.

14. The method of claim 1, wherein the oil is recovered using forced gravity drainage and free gravity drainage.

15. The method of claim 1, wherein the oil is mobilized with unthickened $CO_2$ injected into the top of the reservoir.

16. A system for oil recovery, comprising:
   an injection well;
   a reservoir containing oil positioned below the injection well;
   thickened $CO_2$, wherein the thickened $CO_2$ comprises a thickener comprising a blend of 50 vol. % of a copolymer comprising an acrylate with 50 vol. % of a mixture comprising propylene carbonate, allyl this ethyl carbonate, propylene allyl ethyl carbonate, dimethyl carbonate, white oil, silicon, or petroleum ether, or a combination thereof;
   an interface between the thickened $CO_2$ and the oil;
   unthickened $CO_2$ disposed over the thickened $CO_2$; and
   a horizontal recovery well drilled below the reservoir.

17. The system of claim 16, wherein the thickener has a molecular weight of 500,000 g/mol, a pH of 5.0 to 8.0, a relative density of 0.90 to 1.10, a dissolution speed of less than about three minutes for one percent in liquid $CO_2$ at 25° C., or a combination thereof.

18. The system of claim 16, wherein the reservoir comprises about 0.1 to 0.2 pore volumes of thickened $CO_2$.

19. The system of claim 16, wherein the thickened $CO_2$ comprises 2 vol. % thickener and 98 vol. % supercritical $CO_2$.

20. The system of claim 16, further comprising a pay zone positioned below the interface, wherein the pay zone comprises channels that have higher relative permeability to gas flow.

21. The system of claim 16, wherein the thickened $CO_2$ is uniform across the interface.

22. The system of claim 16, comprising a horizontal injection well.

23. The system of claim 16, comprising a vertical recovery well.

24. The system of claim 16, wherein the reservoir pressure is below ambient pressure.

* * * * *

UNITED STATES PATENT AND TRADEMARK OFFICE
CERTIFICATE OF CORRECTION

PATENT NO. : 11,867,038 B2
APPLICATION NO. : 17/643067
DATED : January 9, 2024
INVENTOR(S) : Zuhair Al-Yousif et al.

It is certified that error appears in the above-identified patent and that said Letters Patent is hereby corrected as shown below:

In the Claims

Column 8, Line 18, Claim 16, please replace "allyl this" with -- allyl --.

Signed and Sealed this
Thirtieth Day of April, 2024

Katherine Kelly Vidal
*Director of the United States Patent and Trademark Office*